G. PALMER.

Improvement in Preserving Wood.

No. 5,040. Reissued Aug. 20, 1872.

Witnesses:
Franck L. Durand
C. L. Evert.

George Palmer, Inventor.
per Alexander Wilson
Attorneys.

UNITED STATES PATENT OFFICE.

GEORGE PALMER, OF LITTLESTOWN, PENNSYLVANIA, ASSIGNOR OF ONE-FOURTH INTEREST TO JAMES M. MASON, OF WASHINGTON, D. C.

IMPROVEMENT IN PRESERVING WOOD.

Specification forming part of Letters Patent No. 49,146, dated August 1, 1865; reissue No. 5,040, dated August 20, 1872.

*To all whom it may concern:*

Be it known that I, GEORGE PALMER, of Littlestown, in the county of Adams and State of Pennsylvania, have invented certain new and useful Improvements in Preserving Wood; and do hereby declare that the following is a full, clear, and exact description thereof.

The object of my invention is to preserve timber of all kinds from decay, such as railroad-ties, fence-posts, beams, scantlings, pumps, curb-wells, all wooden building material, and in truth any timber that is to be exposed or buried. My invention consists in the preservation of timber, whether perfectly green or partially or thoroughly seasoned by first subjecting it to heat in a closed chamber, heating-furnace, or other suitable place, the intensity of the heat being regulated in accordance with the thickness, kind, and form of the lumber to be preserved. After heating, the wood is withdrawn from the chamber or receptacle while hot, and is then saturated with any resinous, oily, fatty, bituminous, or greasy substance that will impregnate the cells or pores and entirely fill the same.

In preparing the wood, before the preservative matter is applied, the heat should not be of such intensity, or the wood allowed to be subjected to the heat for sufficient length of time to destroy the fiber of the wood to be preserved, for it is well known that wood contains a certain quantity of elastic matter, which, when once entirely destroyed, renders the wood brittle and worthless; hence the heating of the timber must be carefully regulated so as to avoid this effect. To regulate this the wood is usually extracted from the hot chamber as soon as vapor, steam, and gas cease to ascend therefrom. When this occurs and nothing but hot air is seen emanating from the timber, the same is at once withdrawn and the preservative applied, either by placing the wood in a vat containing the substance or by coating therewith, or in any other well-known manner. By thus treating the wood the pores are opened and the gaseous substance is drawn out, and the sap and moisture are dried to such a degree that resinous, oily, or bituminous substances are applied to the wood and penetrate it to its fullest capacity without being repelled by the gas or steam generated within. This mode of treatment effectually preserves, protects, and solidifies the wood.

Figure 1:
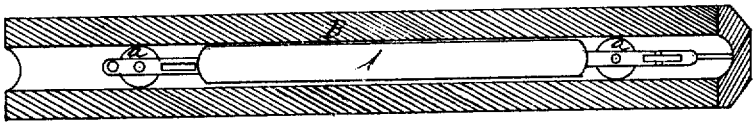
Figure 2:
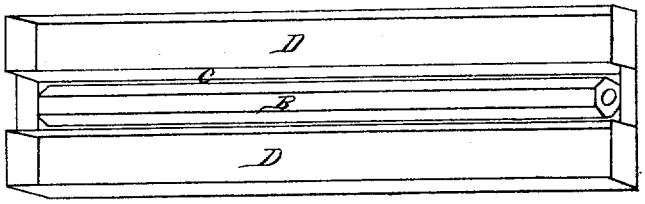
Figure 3:
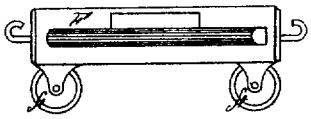
Figure 4:
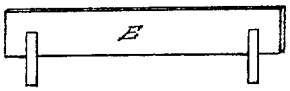
Figure 5:
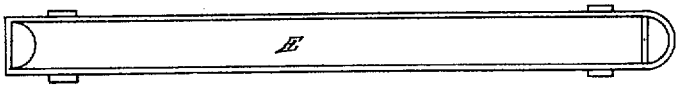

For the purpose of illustrating the process for some forms of timber, I refer to the following figures in the drawing: Figure 1 shows a section (bored through) of a pump-log, cut in half longitudinally, with the apparatus for heating, opening pores, and extracting the damp and gas from the timber in the bore or cavity, preparatory to saturating. Fig. 2 represents a top view of double fire-box and trough, for preparing the outer surface of pump-logs or other timber, the same process of saturating. Fig. 3 shows a side view of fire-box or wheels, for passing over or under any surface of timber, to prepare it for the process. Fig. 4 shows a side elevation of a trough for saturating timber. Fig. 5 is a top view of a long trough for the same purpose.

In preparing timber bored through longitudinally for pumps or for water-pipes, I prefer to use a sheet-iron cylinder or pipe furnace, A, supported at both ends on rollers *a a d d*, two of them being placed at right angles with the other two, they and the pipe-furnace A being of such dimensions as to pass freely into the cavity made by boring the timber, the pipe-furnace being heated quite hot by having a fire of coals in it. It is placed in the bore of the timber, where it can be moved from end to end, any required length of time, the rollers *a a* keeping it just off the surface, so that it will not char the wood; but the heat being intensified by the draft of air passing through the pipe-furnace longitudinally, as it is being moved laterally, will open the pores and generate the steam and gas from the timber, which will pass out of both ends. When this process of heating the inside is going on the outer surface may also be undergoing the same process by having the timber B placed in the trough C of the double fire-box D D, as seen in Fig. 2, or other suitable device, when it can be turned over, so as to get a uniform heat entirely through the timber, and all of the gas and dampness dried out of it. When the timber is thus thoroughly heated the pores of the wood may be saturated and filled with any oily, resinous, or bituminous substance applied hot to the heated timber by immersing it in a trough, E, made of boiler-iron, under which a fire can be built, as seen in Figs. 4 and 5, or the saturating substances may be applied with swabs with very good success, as there is no steam or gas to repel its entrance into every pore. If it is desired to saturate any considerable-sized fixed surface, like the roof of a building, the deck of a vessel, or the sides of the hull, a fire-box, F, is placed on wheels *f f*, so that it may be passed over or very near and heat the surface without charring or burning, and then immediately apply a substance which is impervious to water.

A most excellent roof may be made of tongued-and-grooved plank, and one that will be tight and durable without any other covering, and so for the outside of farm buildings generally, as well as fence-posts, and rails or palings. This process may be applied to timber for all the various purposes such as railroad cross-ties and string-pieces, bridge-timbers, flumes, aqueducts, cisterns, and reservoirs, water-tanks, telegraph-poles, and posts for all purposes. Thus, it will be seen, timber for various purposes can be made to last for years, and all of the bad taste in water, and the pernicious effects of decayed wood in and about wells and cisterns, may be entirely remedied.

For ordinary timber none of the above specified apparatus are required, as any ordinary closed chamber may be used for heating it properly, and any known mode or apparatus may be used for immersing or applying the preservatives; hence I do not confine myself to the above-described (nor to any particular) apparatus for the preservation of wood by my process; nor do I confine myself to the use of any particular and well-known wood preservative that can be applied.

Having thus fully described my process for preserving wood, what I claim, is—

1. The mode of applying and heating the inner and outer surfaces of timber of all kinds sufficiently to open the pores of the wood and extract the sap and gaseous matter, substantially as described, for the purposes specified.

2. Opening the pores of timber by applying heat, substantially as described, and saturating the timber thus treated with oil, resinous, bituminous, or equivalent preservative substances that will penetrate the wood to its fullest capacity.

In testimony that I claim the foregoing I have hereunto set my hand this 12th day of August, 1872.

GEORGE PALMER.

Witnesses:
EDM. F. BROWN,
JAS. M. MASON.